Sept. 1, 1931.     H. M. GUSDORF     1,821,213

PIGSKIN INNERSOLES

Original Filed June 20, 1929

Inventor,
Harold M. Gusdorf,
By Minturn & Minturn,
Attorneys.

Patented Sept. 1, 1931

1,821,213

UNITED STATES PATENT OFFICE

HAROLD M. GUSDORF, OF INDIANAPOLIS, INDIANA

PIGSKIN INNERSOLE

Original application filed June 20, 1929, Serial No. 372,271. Divided and this application filed May 24, 1930. Serial No. 455,189.

This application is a division from my application filed in the U. S. Patent Office, June 20, 1929, Serial No. 372,271, entitled Method of forming insoles.

Pig skin leather made from pig skin strips produces a remarkably satisfactory inner sole because of very natural desirable characteristics of the skin. The skin on a pig or hog has sinuous fibers running parallel to the back bone and substantially straight fibers running at right angles to the bone, the straight fibers passing downwardly and around to support the belly while the sinuous fibers permit longitudinal stretching. The resulting inner soles when cut properly are very flexible lengthwise and firm and less yielding crosswise, when cut with longitudinal dimensions of the inner sole parallel with the backbone line of the pig. These natural characteristics lend a shape-keeping quality to the shoe across the wider portion of the foot and also add to the comfort of the wearer.

Pig skin strips are taken off the fat back of the pig by the packer. The custom of cutting up an animal for food consumption determines the location from which the strips are taken. The pig is cut into hams, shoulders, bellies and backs. The pork-loin is pulled from this fat back and the skins from these fat backs, called pig skin strips, are used for tanning purposes. It is bounded by the backbone on one side, the belly on the other side, the shoulder on one end, and the ham on the other end. These strips usually measure five to six inches wide by eighteen to twenty-four inches long.

My invention contemplates the cutting of the original pig skin leather strips into pieces large enough both in length and width to permit cutting therefrom, side by side, two inner soles, as will hereinafter be explained, the pieces being so cut as to proportionate length and width as to insure the insoles being cut in the proper direction to yield lengthwise but resist stretching sidewise of the sole.

The invention is herebelow described in detail, with reference being made to the accompanying drawings, in which—

Figure 1:
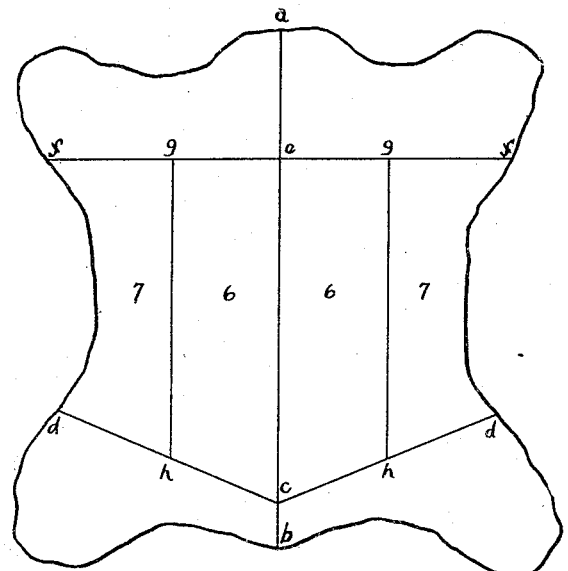
Figure 3:
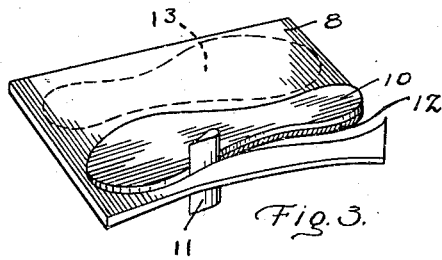
Figure 2:
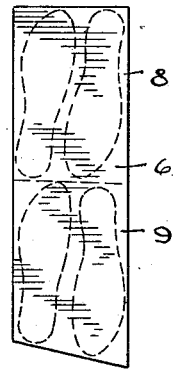
Figure 4:

Fig. 1 is a diagram of a pig skin illustrating how a packer cuts the skin in cutting a slaughtered pig for meat;

Fig. 2, a plan view of a pig skin strip indicating by dash lines the line of division into blocks and the relative location of the inner soles to be cut therefrom;

Fig. 3, a view in perspective illustrating diagramatically the method of cutting an insole from the leather block; and Fig. 4, a plan view of a finished inner sole.

Like characters of reference indicate like parts throughout the several views in the drawings.

Referring to Fig. 1, the custom in slaughtering pigs is to split the carcass into halves along the backbone shown by the lines a—b. Then these halves are cut on the lines c—d into hams, e—f into shoulders and on the lines g—h to make fatback portions 6 and bacon portions 7. The skin is kept on all of the portions except the fatbacks 6 from which it is removed and tanned into pig skin leather.

In my method, I cut the original pig skin leather strips 6, by a transverse cut, into two blocks 8 and 9, both blocks being amply wide to make two inner soles when the narrow heelends are reversed on the blocks as shown in Fig. 2.

The inner soles may then be cut from these blocks 8 and 9 at once without the prior waste of the preliminary blocking. The blocks 8 and 9 are taken to the rounding machine (not shown) and a pattern in the form of a wooden block 10 of the exact shape of the soles to be cut is properly placed and held against the leather block which is then passed across a knife 11, Fig. 3, with the wooden block serving as a guide to let the knife follow its contour and first cut one inner sole 12 therefrom and then a second inner sole 13 both from the same leather block, all with the minimum of waste of the pig skin leather.

Therefore, in carrying out my invention, I cut the pig skin leather strips 6 into separate blocks 8 and 9, each of which will make two inner soles, and these blocks 8 and 9 are supplied directly to the shoe manufacturer who cuts the inner soles to the exact sizes directly from these blocks 8 and 9, thereby insuring that the inner soles be cut in the proper relation to the back bone of the pig.

I claim:

1. An inner sole composed of pigskin material with its fibers so disposed as to be flexible longitudinally and laterally but which will substantially resist any transverse stretching.

2. An inner sole made of pigskin leather having the straighter fibers thereof disposed principally crosswise of the sole and the more sinuous fibers disposed longitudinally thereof.

In testimony whereof I affix my signature.

HAROLD M. GUSDORF.